United States Patent Office 3,474,091
Patented Oct. 21, 1969

3,474,091
3-CYANOMETHYLENE-PREGNENES AND THEIR
MANUFACTURE AND USE
Ulrich Stache, Hofheim, Taunus, Werner Fritsch,
Neuenhain, Taunus, and Werner Haede and
Gerhard Vogel, Hofheim, Taunus, Germany, assignors to Farbwerke Hoechst Aktiengesellschaft
vormals Meister Lucius & Bruning, Frankfurt am
Main, Germany, a corporation of Germany
No Drawing. Filed Apr. 10, 1967, Ser. No. 629,377
Int. Cl. C07c *173/00, 169/34;* A61k *27/00*
U.S. Cl. 260—239.55                     14 Claims

ABSTRACT OF THE DISCLOSURE 3-cyanomethylene-20-one pregnenes, including pregnadienes and pregnatrienes, having gestagenic activity. Method of making such compounds by reacting pregnene-3,20-diones with a cyanomethyl dialkyl phosphonate.

The present invention is concerned with new unsaturated 3-cyanomethylene steroids and with their manufacture and use.

It has already been known to react saturated 3-oxosteroids of the cholestane and androstane series with carbalkoxy-methyl-dialkyl-phosphonates or cyanomethyl-dialkyl-phosphonates in the presence of bases in order to obtain the corresponding 3-carbalkoxy-methylene steroids or 3-cyanomethylene-steroids. (Chem. Ber. 91, 61 (1958)). For instance, Bose et al. (Tetrahedron Letters, 959 (1963)) disclosed for the first time the preparation of 3-carbethoxy-methylene derivatives of the cholestane and androstane series and Drehfahl et al. (Chemische Berichte 97, 2011 (1964)) the preparation of 3-cyanomethylene-cholestane.

The present invention provides a process for the manufacture of mono- or poly-unsaturated 3-cyanomethylene-pregnane compounds, which comprises reacting a mono- or poly-unsaturated 3-oxo-pregnene compound with a cyanomethyl-dialkyl-phosphonate in the presence of an anhydrous base or alcoholate in an organic solvent, and if desired, saponifying any ester group or esterifying any hydroxyl group in the resulting compound.

When operating in this way, it is surprising that the 20-oxo-function of pregnene-20-one compounds does not react simultaneously.

Since the process of the present invention involves the use of such steroids as, for example, 3-oxo-$\Delta^4$- or 3-oxo-$\Delta^1$-pregnenes or 3-oxo-$\Delta^{4,6}$- or 3-oxo-$\Delta^{1,4}$-pregnadienes or 3-oxo-$\Delta^{1,4,6}$-pregnatrienes as starting materials, the 3-cyanomethylene-derivatives of the mono- or poly-unsaturated pregnene compounds are generally obtained as cis/trans-isomeric mixtures with regard to the arrangement of the cyano-group at the exocyclic 3-double linkage, in contradistinction to the results published by Bose et al. who obtained only a single cis-oriented isomer.

The process of the present invention proceeds according to the following scheme when using, for example, a 3-oxo-$\Delta^{4,6}$-pregnadiene compound of the 17-acyloxy series:

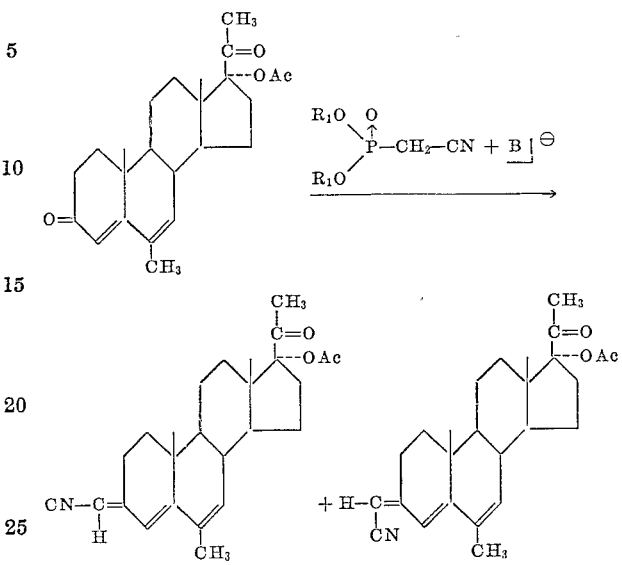

$R_1$ representing $CH_3$ or $C_2H_5$ and B representing a base.

The mono- or poly-unsaturated pregnene compounds used as starting materials for the process of the present invention are prepared according to known methods. In other positions of the steroid structure, functions inert to the reactants may be present without interfering in the reaction, for example alkyl groups, such as a 6- or 17α-alkyl group, alkene groups, for example an isolated $\Delta^{9(11)}$-double bond or an exocyclic 16-methylene group, ether groups, for example a 17α-alkoxy group, hydroxyl groups, for example a 17α- or a 21-hydroxyl group, ester groups, for example a 17α- or 21-acyloxy group, halogen atoms, for example a 6- or 9-halogen group, or epoxide groups, for example a 6α,7α-oxido group. When using more than one mol-equivalent of base, ester radicals present in the steroid molecule can be partially or completely exchanged for or saponified to the corresponding hydroxyl groups which, if desired, may be re-esterified again.

As starting materials for the process of the present invention there may be used, for example:

$\Delta^4$-pregnene-3,20-dione,
$\Delta^{4,6}$-pregnadiene-3,20-dione,
17α-hydroxy-$\Delta^4$-pregnene-3,20-dione,
17α-hydroxy-$\Delta^{4,6}$-pregnadiene-3,20-dione,
17α-hydroxy-6α(or 6β)-methyl-$\Delta^4$-pregnene-3,20-dione,
17α-hydroxy-6-methyl-$\Delta^{4,6}$-pregnadiene-3,20-dione,
17α-hydroxy-6α(or 6β)-fluoro-$\Delta^4$-pregnene-3,20-dione,
17α-hydroxy-6α(or 6β)-chloro-$\Delta^4$-pregnene-3,20-dione,
17α-hydroxy-6-fluoro-$\Delta^{4,6}$-pregnadiene-3,20-dione,
17α-hydroxy-6-chloro-$\Delta^{4,6}$-pregnadiene-3,20-dione,
17α-hydroxy-6-bromo-$\Delta^{4,6}$-pregnadiene-3,20-dione,
17α-hydroxy-6α,7α-oxido-$\Delta^4$-pregnene-3,20-dione,
17α-hydroxy-$\Delta^{1,4}$-pregnadiene-3,20-dione,
17α-hydroxy-$\Delta^{1,4,6}$-pregnatriene-3,20-dione,
17α-hydroxy-6α-(or 6β)-methyl-$\Delta^{1,4}$-pregnadiene-3,2-dione,
17α-hydroxy-6-methyl-$\Delta^{1,4,6}$-pregnatriene-3,20-dione, 17α-hydroxy-6α-(or 6β)-fluoro-Δ$^{1,4}$-pregnadiene-3,20-dione,
17α-hydroxy-6α-(or 6β)-chloro-Δ$^{1,4}$-pregnadiene-3,20-dione,
17α-hydroxy-6-fluoro-Δ$^{1,4,6}$-pregnatriene-3,20-dione,
17α-hydroxy-6-chloro-Δ$^{1,4,6}$-pregnatriene-3,20-dione,
17α-hydroxy-6-bromo-Δ$^{1,4,6}$-pregnatriene-3,20-dione,
17α-hydroxy-6α,7α-oxido-Δ$^{1,4}$-pregnadiene-3,20-dione, as well as their 17α-acyloxy- and 16-methylene derivatives or their 17α-acyloxy derivatives respectively, 21-desoxy-6α-methyl-9α-fluoro-11β,17α-dihydroxyΔ-Δ1,4-pregnadiene-3,20-dione,
Cortisone, Cortisol, as well as their 21-acyloxy derivatives, their 6- and 9-fluorine and their 16-methylene- and 21-acyloxy derivatives.

As the phosphonates, cyanomethyl-dimethyl phosphonates or cyanomethyl-diethyl-phosphonates are preferably used.

Alkali metal hydrides, alkaline earth metal hydrides, alkali metal amides, alkaline earth metal amides as well as alkali metal alcoholates and alkaline earth metal alcoholates are generally used as the bases.

For carrying out the process of the present invention the 3-oxo-pregnene compounds are dissolved or suspended in an inert organic solvent such, for example, as an ether, preferably tetrahydrofuran, dioxan, a diethylene-glycol-dialkylether, a diethylglycol-dialkyl ether or a glycol-dialkylether, in an alcohol, preferably methanol, ethanol or tert.butanol, in dimethyl-sulfoxide, in dimethyl-formamide or, if desired, in a mixture of these solvents, and a mixture of 1 to 5 mol-equivalents of phosphonate in one of the above-mentioned solvents or a mixture thereof is added. At a temperature between −30° C. and the boiling temperature of the solvent used, preferably, for example, at a temperature between 0° C. and 80° C., a solution of 1 to 5 mol-equivalents of one of the above-mentioned bases, preferably potassium ethylate or sodium-ethylate, potassium-methylate or sodium-methylate or potassium-tert.butylate or sodium-tert.butylate or potassium amide or sodium-amide or potassium hydride or sodium hydride, in one of the above-mentioned solvents may be added dropwise while stirring to the reaction mixture which is then exposed to the action of the base, preferably at a temperature between 0° C. and 80° C., until it is ascertained by measuring the pH-value or by titration that 1 mol-equivalent of base has been consumed, or until the evaluation of the bands of the infrared spectrum of samples taken off from the reaction mixture and worked up indicates that a saponification of additionally present ester groups into hydroxyl groups has taken place, if it is desired to convert the ester groups into hydroxyl groups. The process can also be effected in a reverse order by introducing the steroid compound and the base into the above-mentioned solvents and adding dropwise a solution of the phosphonate to the reactant. Finally, it is possible to add the steroid component to a solution of the phosphonate and the base.

The products of the present invention are isolated by pouring the reaction mixture into water, whereby they are often obtained in a crystalline form and can be isolated directly by filtration. In the case of oily reaction products, into which group fall the 17α-acyloxy-pregnene compounds with an unsaponified ester group, these compounds are extracted several times with an organic solvent immiscible with water, the combined extracts are washed with water, the organic solvents are distilled off and, if desired, the products then obtained are crystallized in an appropriate organic solvent. By smooth alkaline saponification of the 17α-acyloxy group to the 17α-hydroxyl group, according to the usual methods, the oily products originally obtained can be collected in the form of the 17α-hydroxyl steroids on which they are based, as crystalline cis/trans-isomeric mixtures and can be liberated from accompanying impurities by digestion with non-polar organic solvents, such as petroleum ether. It is not preferable to separate the isomers of the 17α-acyloxy-pregnene compounds. However, it is possible to separate the cis/trans-isomers of the 17α-hydroxyl-pregnene compounds by fractional recrystallization into the pure cis- or trans-isomers respectively. If desired, these can be re-esterified by known methods to obtain the corresponding 17α-acyloxy-3-cyanomethylene-pregnene compounds.

The products of the process of the present invention are obtained in yields between 80 to 100% of the theoretical yield.

The present invention also provides the 3-cyanomethylene-pregnenes produced by the above process.

The compounds of the invention have a gestagenic action and are distinguished by a favorable relationship of the pure gestagenic action to the gonadotropin-inhibiting action, and can be used as contraceptives. They can likewise be used as intermediate compounds for the manufacture of other steroid compounds.

In the corticoid series the compounds of the present invention show a favourable anti-inflammatory action.

The present invention accordingly further provides pharmaceutical preparations which comprise 3-cyanomethylene-pregnenes in admixture or conjunction with a pharmaceutically suitable carrier.

The following examples illustrate the invention. All the operations were carried out under an atmosphere of pure nitrogen. If not indicated otherwise, the infrared spectra were taken in potassium-bromide, and the ultra-violet spectra in methanol.

EXAMPLE 1

To the combined solutions of 3.14 g. of Δ$^4$-pregnene-3,20-dione (0.01 mol) in 12.5 cc. of absolute tetrahydrofuran and 3.09 grams of cyanomethyl-diethyl-phosphonate (0.018 mol) in 32.5 cc. of absolute ethanol there was added dropwise while stirring at room temperature during the course of 90 minutes a solution of 750 mg. of recently prepared sodium-ethylate (0.01 mol+10%) in 12.5 cc. of absolute ethanol. After further stirring for 35 minutes at room temperature the pH-value of the reaction mixture was found to be 7–8 which meant that the reaction had been completed. The reaction mixture was poured into water, the crystalline precipitate that had formed was filtered off, thoroughly washed with water and dried under reduced pressure over P$_2$O$_5$. 3.1 grams of crystalline 3-cyanomethylene-Δ$^4$-pregnene-20-one were obtained which melted at 110–125° C.

$\lambda_{max.}=272$ mμ, ε=24,800.

Characteristic infrared bands: 2240, 1710, 1625 and 1590 cm.$^{-1}$.

EXAMPLE 2

(a) To a solution of 7.7 grams of 6α-methyl-17α-acetoxy-Δ$^4$-pregnene-3,20-dione (0.02 mol) and 6.18 grams of cyanomethyl-diethyl-phosphonate (~0.035 mol) in 28 cc. of absolute tetrahydrofuran and 70 cc. of absolute ethanol a solution of 1.5 g. of recently prepared sodium-ethylate (0.02 mol+10%) in 35 cc. of absolute ethanol was added dropwise while stirring during the course of 30 minutes at a temperature of about 40° C. Stirring was continued for a further 60 minutes at a bath temperature between 30 and 40° C. and the reaction was then interrupted, the pH-value having then been measured as 7–8. The reaction mixture was poured onto 800 ml. of water to which a small amount of NaCl had been added, it was extracted several times by means of methylene-chloride, the combined organic extracts were washed with water, the solvent was distilled off and, after elimination of the last volatile admixtures in a high vacuum, 8.1 g. of 3-cyanomethylene - 6α - methyl - 17α - acetoxy - Δ$^4$-pregnene-20-one were obtained in the form of a light yellowish oil (cis/trans isomeric mixture).

$\lambda_{max.}$=273 m$\mu$ (methanol), $\epsilon$=22,400.
Characteristic infrared bands (measured as oil): 2220, 2270, 1740, 1720, 1620, 1590, and 1250 cm.$^{-1}$.

After prolonged standing and trituration with a glass rod the oil started to partially crystallize from a small amount of ether. The 3-(trans-cyanomethylene)-6$\alpha$-methyl - 17$\alpha$ - acetoxy - $\Delta^4$ - pregnene - 20 - one was obtained in the form of fine white crystals having a melting point of 175–177° C. Ultraviolet and infrared data vide paragraph (d).

(b) For saponifying the 17-acetate group, 8 grams of the oil 3-cyanomethylene-6$\alpha$-methyl-17$\alpha$-acetoxy-$\Delta^4$-pregnene-20-one were dissolved in 800 cc. of methanol and at 20° C. 120 cc. of an aqueous 2 N-sodium hydroxide solution was added. The reaction solution was allowed to stand over nitrogen for 64 hours at 20° C., 20 cc. of glacial acetic acid were then added and the reaction mixture was concentrated to about 100 cc. It was extracted several times with benzene, the combined organic extracts were washed with hydrogen carbonate and water until showing a neutral reaction and after elimination by distillation 6.1 grams of a white oily-crstalline residue were obtained constituting the cis-trans isomeric mixture of 3-cyanomethylene - 6$\alpha$ - methyl - 17$\alpha$ - hydroxy - $\Delta^4$ - pregnene-20-one.

$\lambda_{max.}$=272 m$\mu$, $\epsilon$=22,900.

(c) For separating the isomers, the crystalline residue was boiled with ether, and the undissolved crystals filtered off (4.5 grams) and recrystallized several times from a mixture of methanol and ether. 1.7 grams of pure 3-(trans - cyanomethylene) - 6$\alpha$ - methyl - 17$\alpha$ - hydroxy-$\Delta^4$-pregnene-20-one were obtained having a melting point of 200–202° C.

$\lambda_{max.}$=272 m$\mu$, $\epsilon$=23,850.
Characteristic infrared bands: 3550, 2250, 1715, 1620 and 1590 cm.$^{-1}$.

For the preparation of the corresponding pure cis-isomer the filtrate of the initial mother-liquor was evaporated under reduced pressure and the clear oil obtained (1.6 grams) was filtered with 400 cc. of benzene over 20 grams of Al$_2$O$_3$ (Woelm, neutral, degree of activity II). After elimination of the benzene by distillation, 1.52 grams of a light oil were obtained which, on standing, slowly crystallized. After drying in a high vacuum and comminution of the crystalline product, 1.5 grams of 3-(cis-cyanomethylene) - 6$\alpha$ - methyl - 17$\alpha$ - hydroxy - $\Delta^4$ - pregnene-20-one were obtained having a melting point of 90–100° C.

$\lambda_{max.}$=272 m$\mu$, $\epsilon$=25,250.
Infrared bands: 3350, 2250, 1715, 1620 and 1590 cm.$^{-1}$.

(d) For esterifying again the pure cis/trans isomers thus isolated the latter were each suspended with 15 cc. of glacial acetic acid, 15 cc. of acetic acid anhydride and 520 milligrams of p-toluenesulphonic acid and the suspension was stirred for 3 hours at 20° C. It was then poured on 200 cc. of water, and the crystals separating after some time were filtered off and washed with water. After drying in a high vacuum over P$_2$O$_5$ and caustic potash there were obtained from 1.55 grams of 3-(trans-cyano - methylene) - 6$\alpha$ - methyl - 17$\alpha$ - hydroxy - $\Delta^4$-pregnene-20-one, 1.7 grams of 3-(trans-cyanomethylene)-6$\alpha$-methyl-17$\alpha$-acetoxy-$\Delta^4$-pregnene-20-one which after recrystalliaztion from a mixture of acetone and n-hexane melted at 175–177° C.

$\lambda_{max.}$=272 m$\mu$, $\epsilon$=26,000.
Characteristic infrared bands: 2230, 1740, 1710, 1620, 1590 and 1250 cm.$^{-1}$.

From 1.4 grams of 3-(cis-cyano-methylene)-6$\alpha$-methyl-17$\alpha$-hydroxy-$\Delta^4$-pregnene-20-one, 1–2 grams of pseudocrystalline 3 - (cis - cyano - methylene) - 6$\alpha$ - methyl-17$\alpha$-acetoxy-$\Delta^4$-pregnene-20-one were obtained, melting at 100–115° C.

$\lambda_{max.}$=272 m$\mu$, $\epsilon$=26,500.
Characteristic infrared bands: 2220, 1740, 1720, 1625, 1590 and 1250 cm.$^{-1}$.

EXAMPLE 3

To the combined solutions of 772 milligrams of 6$\alpha$-methyl - 17$\alpha$ - acetoxy - $\Delta^4$ - pregnene - 3,20 - dione (0.002 mol) in 6 cc. of absolute tetrahydrofuran and 1.85 grams of cyanomethyl-diethyl-phosphonate (0.01 mol) in 6 cc. of absolute ethanol, a solution of 450 milligrams of sodium-ethylene (0.006 mol+10%) in 7 cc. of absolute ethanol was added dropwise while stirring at room temperature during the course of 20 minutes. Immediately after the dropwise introduction of the base an ultraviolet measurement ($\lambda_{max.}$=272 m$\mu$) as well as an infrared measurement (no hydroxyl bands in the range of 3300–3370 cm.$^{-1}$ and no 3-keto bands at 1680 cm.$^{-1}$, but a nitrile band at 2250 cm.$^{-1}$ and an ester band at 1735 and 1260 cm.$^{-1}$) showed that the desired reaction of the 3-keto group had exclusively occurred. For completing the reaction, stirring was continued for a further 30 minutes at room temperature, the reaction product was worked up as described under Example 2(a) and 3-cyanomethylene-6$\alpha$ - methyl - 17$\alpha$ - acetoxy - $\Delta^4$ - pregnene - 20 - one was obtained in the form of an oily cis/trans isomeric mixture showing the same UV and IR values as indicated in Example 2(a).

EXAMPLE 4

To a suspension of 1.62 grams of 6$\alpha$,7$\alpha$-oxido-17$\alpha$-acetoxy-$\Delta^4$-pregnene-3,20-dione (0.004 mol+5%) and 1.55 grams of cyanomethyl-diethyl-phosphonate ($\sim$0.008 mol) in 10 cc. of absolute tetrahydrofuran and 16 cc. of absolute ethanol, a solution of 315 milligrams of sodium-ethylate (0.004 mol+15%) in 5 cc. of absolute ethanol was added dropwise during the course of 50 minutes at 40–50° C., whereby the suspended portions slowly dissolved. Stirring was continued for about 35 minutes at 40–50° C. (pH-value: $\sim$7), the mixture was poured onto water, extracted with ethylacetate, the extracts were washed until showing a neutral reaction and the solvent was eliminated by distillation, the last part of a higher boling point being removed in a high vacuum. 1.8 grams of 3-cyanomethylene-6$\alpha$,7$\alpha$-oxido - 17$\alpha$ - acetoxy - $\Delta^4$-pregnene-20-one were obtanied in the form of a light-yellow oil.

$\lambda_{max.}$=272 m$\mu$, $\epsilon$=20,100.
Characterized infrared bands: 2240, 1735, 1620, 1590 and 1260 cm.$^{-1}$ measured as oil).

EXAMPLE 5

1.92 grams of 6-methyl-17$\alpha$-acetoxy-$\Delta^{4,6}$-pregnadiene-3,20-dione (0.005 mol) and 1.9 grams of cyanomethyl-diethyl-phosphonate (0.01 mol) were dissolved in 7.5 cc. of absolute tetrahydrofuran and 20 cc. of absolute ethanol. While stirring at 40–45° C. a solution of 390 milligrams of sodium-ethylate (0.005 mol+15%) in 7 cc. of absolute ethanol was added dropwise during the course of 35 minutes. Stirring was continued for a further 45 minutes at 40° C. and the reaction was then interrupted, the pH-value having been measured as 7–8. The reaction mixture was poured onto 200 cc. of water, it was extracted with benzene, the extracts were washed with water, the solvents were distilled off, the last part of the distillation being carried out in a high vacuum, and 2.1 grams of oily 3-cyanomethylene-6-methyl-17$\alpha$ - acetoxy - $\Delta^{4,6}$-pregnadiene-20-one were obtained in the form of a cis-/trans isomeric mixture.

$\lambda_{max.1}$=315 m$\mu$ ($\epsilon$=32,500), $\lambda_{max.2}$=307 m$\mu$ ($\epsilon$=32,000).

Characteristic infrared bands (measured as oil): 2280, 2220, 1740, 1720, 1635, 1600, 1530 and 1250 cm.$^{-1}$.

For the saponification of the 17-acetate group 2 grams of 3-cyanomethylene-6-methyl - 17α - acetoxy - $\Delta^{4,6}$-pregnadiene-20-one were dissolved in 200 cc. of methanol, 30 cc. of aqueous 2 N-sodium hydroxide solution were added and the mixture was allowed to stand for 64 hours under nitrogen at room temperature. 5 cc. of glacial acetic acid were then added to the reaction mixture, the reaction solution was concentrated to 50 cc., it was extracted with benzene, the extracts were washed with hydrogen carbonate and water until showing a neutral reaction, and the benzene was distilled off to obtain a residual solution of 15 cc. For chromatographic purification the benzene solution was filtered over about 10 grams of $Al_2O_3$ (Woelm, neutral, degree of activity II) and rinsed with 300 cc. of benzene. After elimination of the benzene by distillation the remaining oily residue crystallized thoroughly. It was digested with a small amount of ether and hexane and filtered off. 1.6 grams of crystalline 3-cyanomethylene - 6 - methyl-17α - hydroxy-$\Delta^{4,6}$-pregnadiene-20-one obtained as a cis/trans-isomeric mixture.

Melting range: 155–175° C.
$\lambda_{max.1}$=314 mμ ($\epsilon$=33,200): $\lambda_{max.2}$=307 mμ ($\epsilon$=33,100).
Infrared bands: 3500, 2220, 1710, 1650, 1630 and 1500 cm.$^{-1}$.

3.3 grams of 3-cyanomethylene - 6 - methyl - 17α - hydroxy - $\Delta^{4,6}$ - pregnadiene - 20 - one with 1–13 grams of p-toluenesulphonic acid were suspended in 33 milliters of glacial acetic acid and 33 millilitres of acetic anhydride. After stirring for 3 hours at 20° C., the reaction solution was poured onto water, the crystallisate formed after a certain time was fltered off, thoroughly washed with water and dried at 50° C. in a high vacuum over caustic potash. 3.3 grams of 3-cyanomethylene - 6-methyl-17α - acetoxy - $\Delta^{4,6}$-pregnadiene-20-one were obtained.

Melting point: 110–120° C.
Ultraviolet spectrum:
$\lambda_{max.1}$=314 mμ, $\epsilon$=36,300.
$\lambda_{max.2}$=309 mμ, $\epsilon$=35,900.
Characteristic infrared bands: 2220, 1735, 1720, 1595 and 1260 cm.$^{-1}$.

EXAMPLE 6

To a solution of 2.1 grams of $\Delta^4$-pregnene - 3,20-dione and 2.06 grams of cyanomethyl-diethyl-phosphonate in 29 cc. of absolute dimethyl-formamide was added while stirring a solution of 167 milligrams of sodium in 5 cc. of absolute ethanol at 20° C. Stirring was continued for 90 minutes at 20° C., the reaction mixture is then poured onto water, the oil that separated was extracted with ethyl-acetate, the organic phase was washed twice with water, dried with $Na_2SO_4$ and the solvent was distilled off. An oil was obtained which after the addition of a mixture of ether and petroleum ether crystallized thoroughly. The 3-cyanomethylene - $\Delta^4$ - pregnene-20-one so obtained was filtered off. Melting point 110–125° C.; after recrystallization from ether the substance melted at 142° C. The ultraviolet and infrared data of the reaction product obtained were identical with the corresponding values give in Example 1.

In a second reaction batch a corresponding amount of absolute dimethyl-sulphoxide was used as solvent instead of dimethyl-formamide, all the other conditions remaining unchanged. After crystallization with a mixture of ether and hexane, 3-cyanomethylene - $\Delta^4$ - pregnene-20-one having a melting point of 110–125° was obtained which after recrystallization from ether melted at 146–147° C.

The ultraviolet and infrared data of the reaction product obtained were identical with the corresponding values obtained in Example 1.

EXAMPLE 7

(a) To a solution of 12.5 grams of 6-chloro-17α-acetoxy-$\Delta^{4,6}$-pregnadiene-3,20-dione and 10 grams of cyanomethyl-diethyl-phosphonate in 60 cc. of absolute tetrahydrofuran and 40 cc. of absolute ethanol, was added dropwise while stirring a solution fo 820 milligrams of sodium in 40 cc. of absolute ethanol at 40° C. during the course of 45 minutes. Stirring was continued for 1 hour at a 40–50° C. bath temperature and then for 3 hours at room temperature. The solution was then poured onto water, extracted several times with ethyl acetate, the extracts were washed with common salt solution and water until showing a neutral reaction, dried over sodium sulphate and the solvent was distilled off. An oil remained behind which was filtered with 800 millilitres of benzene over a small amount of $Al_2O_3$ (Woelm, neutral, degree of activity II, measurements of column: 3 x 5 cm.). After elimination of the benzene by distillation, 3 - cyanomethylene - 6 - chloro - 17α - acetoxy - $\Delta^{4,6}$-pregnadiene-20-one was obtained in the form of a light clear oil (13.5 grams) which could be recrystallized from methanol at −10° C. (11.7 grams).

Melting point: 170–230° C.
Ultraviolet spectrum (of the oil):
$\lambda_{max.1}$=302 mμ, $\epsilon$=31,200.
$\lambda_{max.2}$=311 mμ, $\epsilon$=29,700.
Characteristic infrared bands (as oil): 2270, 2220, 1740, 1720, 1600 and 1265 cm.$^{-1}$.

(b) 13 grams of oily-3-cyanomethylene-6-chloro-17α-acetoxy-$\Delta^{4,6}$-pregnadiene-20-one were dissolved in 750 cc. of methanol and 195 cc. of an aqueous 2 N-sodium hydroxide solution was added. The mixture was allowed to stand for 60 hours under nitrogen at 20° C., it was then neutralized with 33 cc. of glacial acetic acid and the methanol was distilled off under reduced pressure. 1 liter of water was added, and the precipitating crystallisate was filtered off and washed with water until showing a neutral reaction. For purification the oily crystallisate was filtered as described under paragraph (a) with $Al_2O_3$ and after elimination of the benzene by distillation 11.5 grams of an oil were obtained which crystallized thoroughly in a mixture of ether and hexane. After elimination filtration 10.4 grams of 3-cyanomethylene-6-chloro-17α-hydroxy-$\Delta^{4,6}$-pregnadiene-20-one were obtained in the form of white crystals.

Melting point: 263–265° C. (from acetone).
Ultraviolet spectrum:
$\lambda_{max.1}$=302 mμ, $\epsilon$=33,700.
$\lambda_{max.2}$=311 mμ, $\epsilon$=32,200.
Infrared bands: 3500, 2220, 1710 and 1600 cm.$^{-1}$.

(c) For re-esterifying the reaction product, 10 grams of 3-cyano-methylene-6-chloro-17α-hydroxy-$\Delta^{4,6}$-pregnadiene-20-one were suspended in 100 cc. of glacial acetic acid and 100 cc. of acetic anhydride, and 3.2 grams of p-toluene-sulfonic acid are added. The mixture was stirred for 20 hours at room temperature and poured onto 3 liters of water. The precipitating gum-like oil was filtered off, thoroughly washed with water and filtered in order to be purified, as described under paragraph (a), with 800 ml. of benzene over $Al_2O_3$. After elimination of the benzene by distillation the oil obtained was dissolved in about 70 ml. of methanol. On cooling to −10° C. the reaction product separated in the form of fine crystals. After filtration, 9.2 grams of 3-cyano-methylene-6-chloro-17α-acetoxy-$\Delta^{4,6}$-pregnadiene-20-one were obtained in the form of fine crystals.

Melting point: 170–230° C.
Ultraviolet spectrum:
$\lambda_{max.1}$=302 mμ, $\epsilon$=36,200.
$\lambda_{max.2}$=311 mμ, $\epsilon$=35,000.
Infrared bands: 2220, 1740, 1720, 1600 and 1265 cm.$^{-1}$

EXAMPLE 8

To a suspension of 55 milligrams of sodium hydride (or 90 milligrams of sodium amide) in 3 cc. of absolute tetrahydrofuran a solution of 700 milligrams of cyano-methyl-diethyl-phosphonate in 1 ml. of absolute tetrahydrofuran was added dropwise while stirring and cooling. After the termination of the evolution of hydrogen (or ammonia respectively) a solution of 772 milligrams of 6α - methyl-17α-acetoxy-$\Delta^4$-pregnadiene-3,20-dione in 7 ml. of absolute tetrahydrofuran was added to the reaction solution which had become clear. After stirring for 3 hours at 20° C. the pH-value of the reaction solution was very weak. The solution was poured onto 100 ml. of water, extracted with ether, and the extracts are washed with water and dried with sodium sulphate. After elimination of the ether by distillation under reduced pressure, 820 milligrams of 3-cyanomethylene-6α-methyl-17α-acetoxy-$\Delta^4$-pregnene-20-one were obtained as a solid foam.

Ultraviolet spectrum: $\lambda_{max.}=273$ m$\mu$, $\epsilon=24,100$.
Infrared bands: 2220, 1740, 1720, 1625, 1590 and 1250 cm.$^{-1}$.

EXAMPLE 9

To a suspension of 110 milligrams of sodium hydride (or 180 milligrams of sodium amide) in 4 cc. of absolute tetrahydrofuran a solution of 1.35 grams of cyanomethyl-diethyl-phosphonate in 1 cc. of absolute tetrahydrofuran was dropwise added while stirring and cooling. After the evolution of hydrogen (or ammonia) had been terminated, a solution of 1.48 grams of 17α-acetoxy-$\Delta^{4,6}$-pregnadiene-3,20-dione in 10 cc. of absolute tetrahydrofuran was added to the reaction solution. After stirring for 3 hours and 30 minutes at room temperature the reaction solution was poured into water, extracted with ether, and the extracts were washed with water and dried with sodium sulphate. After elimination of the ether by distillation under reduced pressure, 1.4 grams of 3-cyanomethylene-17α-acetoxy-$\Delta^{4,6}$-pregnadiene-20-one were obtained in the form of a pseudo-crystalline foam which was crystallized from a mixture of ether and hexane.

Melting point: 170–200° C.
Ultraviolet spectrum: $\lambda_{max.1}=311$ m$\mu$, $\epsilon=35,200$, shoulder at 304 m.
Characteristic infrared bands: 2200, 1730, 1715, 1655, 1590 and 1260 cm.$^{-1}$.

The same compound was obtained if instead of tetrahydrofuran absolute diethylene-glycol-dimethyl ether was used as solvent, all the other conditions remaining the same.

EXAMPLE 10

(a) To a solution of 1.54 grams of 6α-methyl-17α-hydroxy-$\Delta^4$-pregnene-3,20-dione and 1.6 grams of cyanomethyldiethyl-phosphonate in 10 cc. of absolute tetrahydrofuran as well as 15 cc. of absolute ethanol, a solution of 114 grams of sodium in 7 cc. of absolute ethanol was added dropwise while stirring during the course of 45 minutes at a bath-temperature of 40° C. Stirring was continued for 2 hours at 20–40° C., the reaction mixture was poured onto water, and the precipitating oily crystallisate was filtered off and thoroughly washed with water. After drying under reduced pressure over $P_2O_5$, 1.5 grams of 3-cyanomethylene-6α-methyl-17α-hydroxy-$\Delta^4$ - pregnene-20-one were obtained showing the physical and spectral data as described in Examples 2(b) and 2(c).

(b) 3-cyanomethylene-6-methyl - 17α - hydroxy - $\Delta^{4,6}$-pregnadiene-20-one and 3-cyanomethylene-6-chloro-17α-hydroxy-$\Delta^{4,6}$-pregnadiene-20-one, showing the same physical and spectral data as indicated in Example 5 and in Example 7(b), respectively, were obtained in an analogous manner from 6-methyl-17α-hydroxy-$\Delta^{4,6}$ - pregnadiene - 3-20-dione and from 6-chloro-17α-hydroxy - $\Delta^{4,6}$ - pregnadiene-3,20-dione, respectively.

EXAMPLE 11

A solution of 3.14 grams of $\Delta^4$-pregnene-3,20-dione, 2.5 grams of cyano-methyldimethyl-phosphonate and 1.24 grams of potassium-tert.butylate in 60 cc. of absolute tert.-butanol was stirred at room temperature until the pH-value was only 8. The soltuion was poured onto water, and the precipitating crystallisate was filtered off and washed out with water. After drying, 2.9 grams of 3-cyanomethylene-$\Delta^4$-pregnene-20-one were obtained showing the same physical and spectral data as described in Example 1.

EXAMPLE 12

To a suspension of 150 milligrams of sodium hydride in 10 cc. of absolute tetrahydrofuran, 2 grams of cyanomethyldimethyl-phosphonate were added dropwise while stirring and cooling. After the evolution of hydrogen had been terminated, a solution of 772 milligrams of 6α-methyl-17α-acetoxy-$\Delta^4$-pregnene-3,20-dione in 7 cc. of absolute tetrahydrofuran was added to the reaction solution. Stirring was continued at 20° C. until a sample taken off showed a UV-maximum at $\lambda_{max.}=272$ m$\mu$. The solution was then poured onto water and the ether was distilled off under reduced pressure. 790 milligrams of 3-cyanomethylene-6α-methyl-17α-acetoxy-$\Delta^4$-pregnene - 20-one were obtained in the form of foam showing the spectral data as described in Example 8.

EXAMPLE 13

To a suspension of 96 milligrams of sodium hydride in 4 cc. of absolute tetrahydrofuran a solution of 700 milligrams of cyanomethyl-diethyl-phosphonate in 1 cc. of absolute tetrahydrofuran was added dropwise while stirring and cooling. After the termination of the evolution of hydrogen, a solution of 810 milligrams of 6-chloro-17α-acetoxy-$\Delta^{4,6}$-pregnadiene-3,20-dione in 6 cc. of absolute tetrahydrofuran was added dropwise to the clear reaction solution, which was cooled in order to avoid an excess of heat. Stirring was continued for a further 2 hours at room temperature, and the reaction mixture was then poured onto a mixture of water and ethanol (9:1). A solid oil separated which was filtered off and washed with water. The oil was dissolved in 5–8 cc. of methanol and the solution was allowed to cool, finally to −30° C. 3-cyanomethylene-6-chloro-17α-acetoxy - $\Delta^{4,6}$ - pregnadiene-20-one was obtained in the form of fine crystals. After filtration it was obtained in a yield of 790 milligrams.
Melting point: 170–230° C. After repeated recrystallization from a mixture of acetone and methanol, said substance was present in the form of a pure isomer having a melting point of 271–273° C.

UV and IR-data as indicated in Example 7(c).
What we claim is:
1. A 3-cyanomethylene-pregnene of the formula:

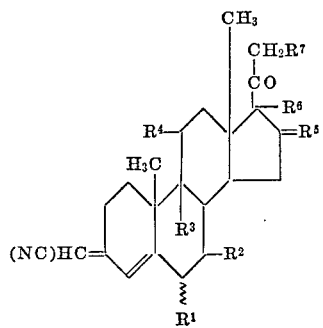

wherein $R^1$, taken alone, represents hydrogen, lower alkyl, fluorine, chlorine, or bromine, each in the α- or β-position; $R^2$, taken alone, represents hydrogen; $R^1$ and $R^2$ taken together, represent a 6α,7α-oxido group or a bond forming a $\Delta^6$ unsaturation; $R^3$, taken alone, represents hydrogen or halogen in the α-position; $R^4$, taken alone, represents hydrogen; $R^3$ and $R^4$, taken together, represent a bond forming a $\Delta^{9(11)}$ unsaturation; $R^5$ represents two hydrogen atoms or a methylene group; $R^6$ represents hydrogen, lower alkyl, hydroxy, lower alkoxy, or lower aliphatic acyloxy, each in the $\alpha$-position; and $R^7$ represents hydrogen, hydroxy, or lower aliphatic acyloxy.

2. 3-cyanomethylene-$\Delta^4$-pregnene-20-one.

3. 3-cyanomethylene-6$\alpha$-methyl-17$\alpha$-acetoxy-$\Delta^4$ - pregnene-20-one.

4. 3-(trans-cyanomethylene)-6$\alpha$-methyl-17$\alpha$ - acetoxy-$\Delta^4$-pregnene-20-one.

5. 3-cyanomethylene-6$\alpha$-methyl-17$\alpha$-hydroxy-$\Delta^4$ - pregnene-20-one.

6. 3-(trans-cyanomethylene)-6$\alpha$-methyl-17$\alpha$ - hydroxy-$\Delta^4$-pregnene-20-one.

7. 3-(cis-cyanomethylene)-6$\alpha$-methyl - 17$\alpha$ - hydroxy-$\Delta^4$-pregnene-20-one.

8. 3-(cis-cyanomethylene)-6$\alpha$-methyl-17$\alpha$-acetoxy - $\Delta^4$-pregnene-20-one.

9. 3-cyanomethylene-6$\alpha$,7$\alpha$ - oxido - 17$\alpha$ - acetoxy - $\Delta^4$-pregnene-20-one.

10. 3-cyanomethylene-6-methyl-17$\alpha$-acetoxy-$\Delta^{4,6}$ - pregnadiene-20-one.

11. 3-cyanomethylene-6 - methyl - 17$\alpha$ - hydroxy - $\Delta^{4,6}$-pregnadiene-20-one.

12. 3-cyanomethylene-6-chloro-17$\alpha$-acetoxy-$\Delta^{4,6}$ - pregnadiene-20-one.

13. 3-cyanomethylene-6-chloro - 17$\alpha$ - hydroxy - $\Delta^{4,6}$-pregnadiene-20-one.

14. 3-cyanomethylene-17$\alpha$-acetoxy - $\Delta^{4,6}$ - pregnadiene-20-one.

References Cited

UNITED STATES PATENTS 3,337,590   8/1967   Bose et al.    260—397

OTHER REFERENCES

Bose et al., "J. Org. Chem.," February 1955, pp. 505–509 relied on.

Drefahl et al., "Chem. Berichte," July 1964, pp. 2011–2013 relied on.

Bose et al., Tetrahedron Letters, 1966, pp. 6263–6265 relied on.

ELBERT L. ROBERIS, Primary Examiner

U.S. Cl. X.R.

260—397.3, 397.4, 397.45, 999